United States Patent [19]

Heidelberg et al.

[11] Patent Number: 4,754,207
[45] Date of Patent: Jun. 28, 1988

[54] ELECTROMAGNETS WITH ADJACENT GROUPS OF ELECTROMAGNETS HAVING DIFFERENT SWITCHING PHASES

[76] Inventors: Götz Heidelberg, Am Hügel 16, D-8136 Percha; Andreas Gründl, Haseneystr. 20, D-8000 München 70, both of Fed. Rep. of Germany

[21] Appl. No.: 910,788

[22] Filed: Sep. 23, 1986

Related U.S. Application Data

[63] Continuation of Ser. No. 722,309, Apr. 12, 1985, abandoned.

[30] Foreign Application Priority Data

Apr. 16, 1984 [DE] Fed. Rep. of Germany ....... 3414312

[51] Int. Cl.$^4$ ...................... H02K 21/12; H02K 29/08
[52] U.S. Cl. ..................................... 318/254; 318/138; 310/68 R; 310/185; 310/198
[58] Field of Search ................. 318/138, 254; 310/145, 310/185

[56] References Cited

U.S. PATENT DOCUMENTS

| | | | |
|---|---|---|---|
| 2,631,264 | 3/1953 | Thomas | 318/254 |
| 2,844,744 | 7/1958 | Meier | 310/46 |
| 2,900,591 | 8/1959 | Jacob | 310/198 X |
| 3,465,225 | 9/1969 | O'Regan et al. | 318/138 |
| 3,473,059 | 10/1969 | Levin et al. | 318/138 X |
| 3,584,280 | 6/1971 | Inagaki | 318/254 |
| 3,586,942 | 6/1971 | McMahan | 318/254 |
| 4,491,769 | 1/1985 | Heidelberg | 318/254 |

FOREIGN PATENT DOCUMENTS

| | | | |
|---|---|---|---|
| 58-12564 | 1/1983 | Japan | 318/254 |
| 58-19153 | 2/1983 | Japan | 318/254 |
| 59-25596 | 2/1984 | Japan | 318/254 |
| 1379598 | 1/1975 | United Kingdom | 310/198 |

OTHER PUBLICATIONS

IBM Technical Disclosure Bulletin, "Linear Incremental Motor" (Feb. 1964), L. J. Thompson, vol. 6, No. 9.

Primary Examiner—Bentsu Ro
Attorney, Agent, or Firm—Hubbard, Thurman, Turner & Tucker

[57] ABSTRACT

A rotatory electromotor having a stator with stator poles and a rotor with rotor poles, permanent magnets being provided for the stator poles or for the rotor poles and electromagnets for the poles not provided with the permanent magnets, electronic switching means being provided for switching electromagnets in accordance with the relative positions of the electromagnets and permanent magnets in each case, and the permanent magnets and the electromagnets being arranged in such a way that only some of the electromagnets of the electromotor can be simultaneously switched in each case. Several adjacent electromagnets form a group of electromagnets belonging to one phase, this group cooperating with a number of permanent magnets located opposite, and adjacent groups of electromagnets belong to different phases.

13 Claims, 4 Drawing Sheets

ELECTROMAGNETS WITH ADJACENT GROUPS OF ELECTROMAGNETS HAVING DIFFERENT SWITCHING PHASES

This application is a continuation of application Ser. No. 722,309, filed Apr. 12, 1985, now abandoned.

The present invention relates to a rotatory electromotor having a stator with stator poles and a rotor with rotor poles, permanent magnets being provided for the stator poles or for the rotor poles and electromagnets for the poles not provided with the permanent magnets, electronic switching means being provided for switching electromagnets in accordance with the relative positions of the electromagnets and permanent magnets in each case, and the permanent magnets and the electromagnets being arranged in such a way that only some of the electromagnets of the electromotor can be simultaneously switched in each case.

Electronically controlled electromotors are becoming increasingly important in a number of areas of application. The electromotors involved are ones in which the necessary periodic switching of electromagnets is no longer carried out by a commutator but by electronic switching means. The electronic switching means include appropriate sensors which detect when the stator and the rotor are located in the relative positions which are favorable for, or necessitate, the switching of the electromagnet(s) to be switched at the moment. The electronic switching means must of course also ensure that the current supply to the particular electromagnet(s) takes place in the direction of current appropriate at the moment.

Electronically controlled electromotors are already known in which permanent magnets have been used either for the stator poles or for the rotor poles. Permanent magnets offer a number of advantages in this connection, among which in particular the lack of current consumption, the small dimensions and the simple production and assembly must be mentioned.

It has already been recognized, as well, that it is frequently unfavorable when all permanent magnets and electromagnets of the electromotor must be switched at the same time. Such a situation in which it is necessary to switch all electromagnets of the electromotor simultaneously, arises in particular when the mutual distance between the permanent magnet poles is equal everywhere. Consequences of the simultaneous switching of all electromagnets involved are that the motor runs relatively irregularly, the mains is loaded pulsatingly and there are difficulties in starting the motor. This may possibly be remedied by arranging the stator poles or the rotor poles not at right angles to the direction of relative movement of the stator poles and rotor poles so that they diverge slightly from perpendicularity. However, this complicates the construction of the motor.

In a known rotatory electromotor of the type mentioned at the outset (European laid-open print No. 94978), the necessity of simultaneously switching all electromagnets is avoided by having the number of electromagnets differ from that of the permanent magnets. As a result, either the electromagnets are all switched at different times or several electromagnets are switched simultaneously which are distributed symmetrically along the periphery of the electromotor and located in analogous relative positions to permanent magnet poles located opposite.

During the work on the present invention, however, it was observed that the switching of adjacent electromagnets at different times involves disadvantages. The switching of a certain electromagnet without simultaneously switching the two adjacent electromagnets leads to disturbing reactions in the two adjacent electromagnets because the switching of the electromagnet under consideration affects the adjacent electromagnet via the particular magnetic circuit. This phenomenon is to be referred to as the "transformer effect". Furthermore, there are also reactions in the electronic switching means assigned to the adjacent electromagnets. The reactions of the above-mentioned type show themselves in reduced utilization of the electromotor, or reduced efficiency, and in possible overloading and thus destruction of components of the electronic switching means.

The invention is based on the problem of providing an electromotor with a reduction of disturbing reactions between adjacent electromagnets.

This problem is solved according to the invention by the following means. Several adjacent electromagnets form a group of electromagnets belonging to one phase, this group cooperating with a number of permanent magnets located opposite, and adjacent groups of electromagnets belong to different phases.

Thus, according to the invention, the adjacent electromagnets belonging to a common group of electromagnets are switched as belonging to one phase very close together in time, preferably simultaneously, and the electromagnets belonging to adjacent groups of electromagnets are switched as belonging to different phases at different times. One will realize that the teaching of the invention leads to those points of the electromotor at which electromagnets to be switched at different times are adjacent, being reduced in number because they are only present at the boundaries or transition points between the groups of electromagnets. Consequently, the disturbing reactions described above are reduced.

The term "pole distance" is intended in the present application to refer to the distance between the centers of the electromagnet poles and the permanent magnet poles as measured in the direction of the relative movement of the corresponding poles. It is also evident that the electromagnets are switched on in each case by the assigned electronic switching means with the direction of current which is correct for the propulsive effect.

In order to make adjacent groups of electromagnets belong to different phases, the geometrical arrangement of the groups of electromagnets and/or the groups of permanent magnets is preferably designed in such a way that the necessity to switch adjacent groups of electromagnets at different times arises due to the geometrical design of the electromotor. Preferred possibilities of doing this are stated in the claims.

The first preferred possibility is characterized in that a phase difference is formed for adjacent groups of electromagnets by having the electromagnet pole distance diverge from the permanent magnet pole distance at the transition point between adjacent groups of electromagnets. The design is preferably such that the permanent magnet pole distances are equal in the entire electromotor and the electromagnet pole distance is smaller or larger than this permanent magnet pole distance at the transition point or boundary between adjacent groups of electromagnets.

The second preferred possibility is characterized in that a phase difference is formed for adjacent groups of electromagnets by arranging the permanent magnets in groups of permanent magnets, the permanent magnet pole distance within the groups of permanent magnets corresponding to the electromagnet pole distance, and the permanent magnet pole distance diverges from the electromagnet pole distance at the transition point between adjacent groups of permanent magnet poles. The design is preferably such that all electromagnets of the electromotor have the same pole distance between each other, whereas, in the case of the permanent magnets, only the pole distances within the groups of permanent magnets are equal to each other and to this electromagnetic pole distance, and a larger or a smaller permanent magnet pole distance is provided at the transition point or boundary between adjacent groups of permanent magnets.

In a preferred development of the invention, the electromagnets are arranged within the groups of electromagnets with the same electromagnet pole distance. When this electromagnetic pole distance corresponds to a permanent magnet pole distance which is equal everywhere, this results in the most complete utilization of the electromotor. On the other hand, it may be advantageous with respect to further evening out the running of the motor and/or favorably modifying the reverse voltage induced in the electromotor, to vary the electromagnet pole distance slightly within the groups of electromagnets so that the electromagnets, or at least some of them, are switched slightly earlier or slightly later than exactly corresponds to the geometrical relative position to permanent magnets located opposite. Such variation in the pole distances may also be carried out in the case of the permanent magnet poles. Such variations may also be applied in the preferred developments as described above, in which case a correspondence of average pole distances should be provided instead where pole distances corresponding to each other are referred to.

Since the electromagnets belonging to a common group of electromagnets are preferably switched simultaneously, it is preferably possible to work with one common eletronic switching means per group of electromagnets. But it may also be favorable in the case of certain designs to divide the switching power up among several electronic subswitching means controlled, for example, by a common sensor means for detecting the relative position of the groups of electromagnets to the permanent magnets. As the switching power decreases, the price of the electronic subswitching means decreases proportionally. Furthermore, this increases the protection against total failure of the electromotor.

In particular when the teaching of the invention is realized by reduced electromagnet pole distances between the groups of electromagnet poles, it is favorable to provide electromagnet poles with little or no winding on the ends of the groups of electromagnets. This does justice to the lack of space at these points.

The areas on the ends of the groups of electromagnets may quite generally be used in a favorable manner for the attachment or the additional attachment of the electromagnets of each group to the stator or to the rotor. More room can be gained in a particularly favorable manner when the electromagnet pole distance is larger at the ends of the groups of electromagnets.

In a preferred development of the invention, the electromagnetic circuit is broken at the transition point between adjacent groups of electromagnets. In this way the disadvantageous reactions of adjacent electromagnets to be switched at different times, as described above, may also be prevented effectively at these points.

Further preferred features which may be realized in the inventive electromotor can be found in European laidopen print No. 94 978. The contents of this publication are made part of the disclosed contents of the present application by virtue of this explicit reference.

Not only electromotors but also electrogenerators may be constructed analogously according to the teaching of the invention, so that the claims and the description of the present invention relate analogously to generators.

The invention and developments of the invention shall be explained in more detail in the following with reference to several embodiments which are shown schematically in part. The figures show.

Figure 1:
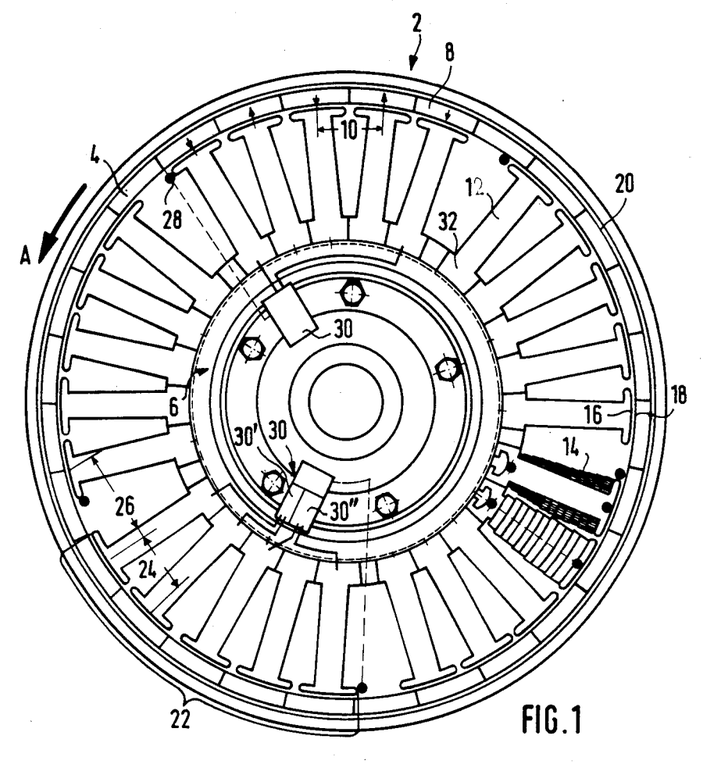
FIG. 1 is a cross-section of a first electromotor.

The electromotor 2 shown in FIG. 1 has a substantially hollow cylindrical rotor 4 and a stator 6 arranged in the interior of said rotor. Permanent magnets 8 are attached around the inner periphery of rotor 4 in an annular arrangement with alternating polarity and an equal permanent magnet pole distance 10 between them. Altogether 25 radially extending electromagnets 12 are attached to stator 6, the windings 14 present for all electromagnets 12 being shown at only two places. The radially outer surface of each electromagnet 12 constitutes a electromagnet pole faces 16, while the radially inner limiting surface of each permanent magnet 8 constitutes a permanent magnet pole face 18. Electromagnet pole faces 16 and permanent magnet pole faces 18 have an air gap between them in the radial direction. Radially outside the circular row of permanent magnets 8 there is a cylindrical, magnetically conductive part 20 as a magnetic return path for the backs of permanent magnets 8 located on the outside.

Five electromagnets 12 are joined to form group 22 of electromagnets in each case, the electromagnet pole distances 24 within this group being equal to each other and equal to permanent magnet pole distances 10. At the transition point between each group 22 of electromagnets and the adjacent group 22 of electromagnets, the electromagnet pole distance 26 at the group boundaries is 1.6 times the electromagnet pole distance 24 within the groups 22 of electromagnets. Permanent magnets 8 are directly adjacent each other in the peripheral direction.

In each group 22 of electromagnets, an electromagnet pole face 16 is provided at the left-hand or right-hand end, in the peripheral direction, with a sensor 28 which is preferably designed as a Hall sensor. Each sensor 28 generates a signal, for example, when it is opposite a permanent magnet north pole, and generates no signal when it is opposite a permanent magnet south pole. The signal state of each sensor 28 is fed electrically to an electronic switching means 30, one switching means 30 being provided per group 22 of electromagnets and only two switching means 30 being shown in the figure for the sake of simplicity. When a signal of sensor 28 of a group 22 of electromagnets is present, switching means 30 of this group 22 ensures that all five electromagnets 12 of this group 22 are subjected to current, the electrical connection of windings 14 to each other or to switching means 30 being such that adjacent electromagnets 12 of this group 22 carry current in opposite current directions. When sensor 28 of this group 22 does not provide a signal, switching means 30 ensures that all electromagnets 12 of this group 22 carry current in the current direction opposite to the previous one. Thus, sensor 28 and switching means 30 ensure that all electromagnets 12 of group 22 under consideration have their current direction reversed when the five electromagnet pole faces 16 are located in the center of five permanent magnet pole faces 18.

Due to the larger electromagnet pole distance 26 at the group boundaries, each group 22 of electromagnets which is adjacent is switched over subsequently so that all five groups 22 of electromagnets are switched over within the period the rotor 4 requires to rotate further past one permanent magnet pole distance 10. The switching over rhythm then begins again by switching over the first group 22 of electromagnets.

It is indicated in the lower portion of FIG. 1 that switching means 30 may also be divided up into two sub-switching means 30' and 30", each sub-switching means switching only some of electromagnets 12 of the particular group 22. A separate subswitching means may also be provided for each electromagnet 12. The various subswitching means are jointly controlled by sensor 28 of this group 22. Thus, the switching power of each sub-switching means is smaller than the overall switching power of a common switching means 30 would have to be.

The individual electromagnets 12 have bases 32 on the radial inside which are enlarged in the peripheral direction. Within each group 22 of electromagnets these bases 32 meet in the peripheral direction, thereby closing the magnetic circuit at these points. Bases 32 do not meet at the boundary between each group 22 and the adjacent group 22, so that there is a disconnection of the magnetic circuit here.

Rotor 4 is of course mounted in front of and/or behind the plane of projection of FIG. 1, whereby the rotor may be conducted closer to the center of the rotational movement by front walls and mounted with a smaller diameter.

The radially outer part of electromotor 2 provided with permanent magnets 8 might also serve as a stationary stator and the part disposed inside and provided with the electromagnets could rotate. Electromagnets 12 might also be attached, protruding radially towards the inside, to the cylindrical outer part of electromotor 2, while permanent magnets 8 are attached on the outside to the radially inside part of electromotor 2.

Figure 2:
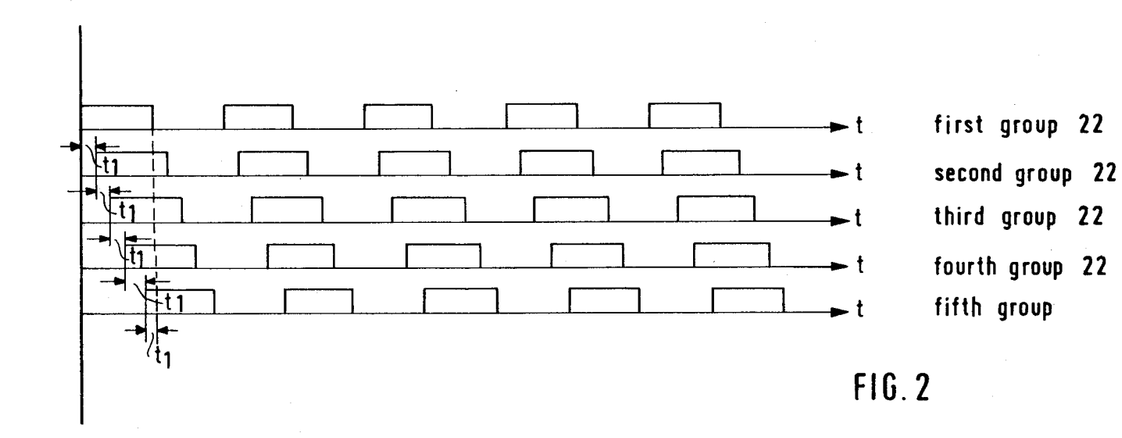
FIG. 2 is a diagram of the variation with time of the sensor signals for the individual groups of electromagnets.

FIG. 2 illustrates the timing of the signals of sensors 28 of the particular groups 22 of electromagnets. The time is recorded in the horizontal direction. The rectangular boxes on the five horizontal lines refer to those time periods in which the particular sensor 28 provides a signal because it is located opposite a permanent magnet north pole. The sections between these boxes refer to the time periods in which the particular sensor 28 does not provide a signal because it is located opposite a permanent magnet south pole. At the beginning and at the end of each box all five electromagnets 12 of the group 22 of electromagnets controlled by the particular sensor 28 are switched over.

It can be seen particularly clearly in FIG. 2 that after a time period $t_1$ corresponding to the continuing rotation of rotor 4 by 0.6 times one permanent magnet pole distance 10, the group 22 of electromagnets which is then adjacent is switched over.

Instead of providing an electromagnet 12 of each group 22 with one sensor 28, as described with reference to FIG. 1, one may also attach a first sensor to the left-hand edge of an electromagnet pole face 16 in FIG. 1 and a second sensor to its right-hand edge as in FIG. 3. The first sensor responds to magnetic north poles and the second sensor to magnetic south poles. When the first sensor is located opposite a magnetic north pole and the second sensor is located opposite a magnetic south pole, a signal is generated. When the first sensor is located opposite a magnetic south pole and the second sensor is located opposite a magnetic north pole, no signal is generated. The mode of operation of switching means 30 remains the same as described above.

A further possibility consists in making electromagnet pole face 16 somewhat shorter in the peripheral direction than permanent magnet pole face 18 (as indicated in FIG. 1) and not only switching over electromagnets 12 with respect to the current passage direction, but switching them off for a short period following a time interval with a first current passage direction, switching them on for the opposite second current passage direction, then switching them off again for a short period, and so on. In this manner, current passage time intervals which contribute relatively little to the generated torque can be eliminated.

Figure 3:
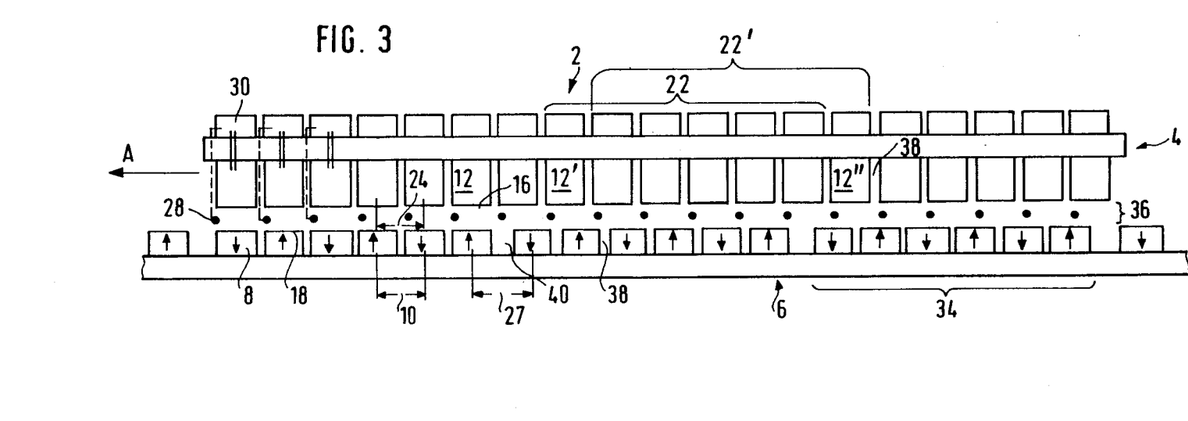
FIG. 3 is a developed view of part of a second electromotor.

FIG. 3 shows a developed view of part of electromotor 2 having a stator 6 and a rotor 4. Rotor 4 moves in a direction A of relative movement relative to stator 6. Permanent magnets 8 with permanent magnet pole faces 18 are attached to the top of stator 6 with their polarity alternating along the stator. The permanent magnets are arranged in groups 34 of permanent magnets each composed of six permanant magnets 8. Within groups 34 of permanent magnets, permanent magnet pole distances 10 are equal to each other; at the transition point or boundary between adjacent groups 34 the permanent magnet distance 27 is somewhat larger.

A row of electromagnets 12 with electromagnet pole faces 16 is arranged on the underside of rotor 4. An air gap 36 exists between permanent magnet pole faces 18 and electromagnet pole faces 16. Electromagnets 12 are arranged with the same electromagnet pole distance 24 in each case, which is equal to permanent magnet pole distance 10. Both permanent magnets 8 within groups 34 of permanent magnets and electromagnets 12 have small gaps 38 between them in direction A of relative movement. Each electromagnet 12 is provided with a sensor, preferably designed as a Hall sensor, at its leading edge or its trailing edge, seen in direction A of relative movement. An electronic switching means 30 is also provided for each electromagnet 12. Sensors 28 respond to the magnetic fields of permanent magnets 8 located opposite, as in the embodiment of FIG. 1. The electrical connection between the particular sensor 28 and the particular switching means 30 is indicated in the case of three electromagnets 12 but otherwise omitted. When, for example, sensor 28 of an electromagnet 12 reaches the first edge of a permanent magnet 8, seen in direction A of relative movement, the corresponding electromagnet 12 is switched over. This state is reached in FIG. 3 precisely for those six electromagnets 12 which are set off as group 22 of electromagnets. When this group of electromagnets moves on further past a permanent magnet pole distance 10, the leading electromagnet 12', seen in direction A of relative movement, is not switched over immediately because its sensor 28 is located above a group boundary gap 40. However, the six electromagnets 12 following electromagnet 12' are switched over, whereby these six electomagnets 12 are the remaining five of the group 22 of electromagnets under consideration before and an electromagnet 12" following them. In this manner, a group 22' of electromagnets consisting of six electromagnets 12 is thus formed again, although it does not include the same electromagnets 12 as before. The six permanent magnets 12 located opposite a group 34 of permanent magnets in the same relative positions thus form a group 22 of electromagnets with constantly changing members which are all switched over at the same time.

In front of group 22 of electromagnets considered above and behind group 22 of electromagnets considered above there are also groups of electromagnets which are switched simultaneously when they assume a corresponding relative position to groups 34 of permanent magnets which are located in front of or behind group 34 of permanent magnets considered above. Due to the larger permanent magnet distance 26 at the group boundary these states are reached with time differences relative to the switching time considered above. Thus, a switching sequence results which is similar to that of the embodiment of FIG. 1 except that the composition of the groups of electromagnets constantly changes and electromotor 2 runs even more smoothly than in the embodiment of FIG. 1. Permanent magnet distance 26 at the group boundary is 1.33 times the permanent magnet distance 10 within groups 34 of permanent magnets, so that the picture of permanent magnets 8 in relative correspondence with electromagnets 12 is repeated after three groups 34 of permanent magnets.

What was said on the embodiment of FIG. 1 with respect to further possibilities of arranging the sensors and switching off electromagnets 12 for a short period applies analogously to the embodiment of FIG. 3.

Permanent magnets 8 may also be provided on rotor 4 and electromagnets 12 on stator 6.

Figure 4A:
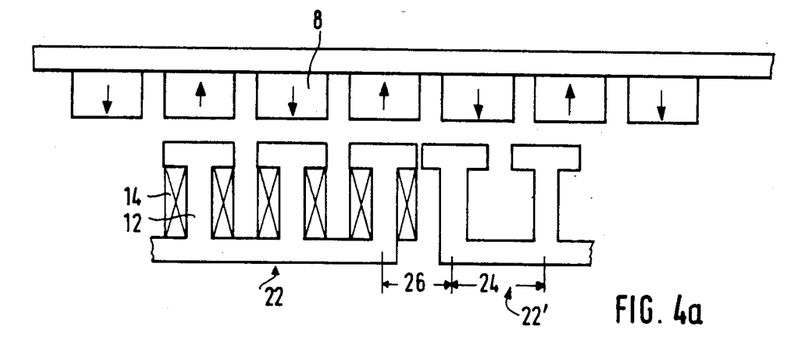
FIGS. 4a, 4b, 4c, 5a and 5b are side views of several configurations of the transition point between groups of electromagnets.
Figure 4B:
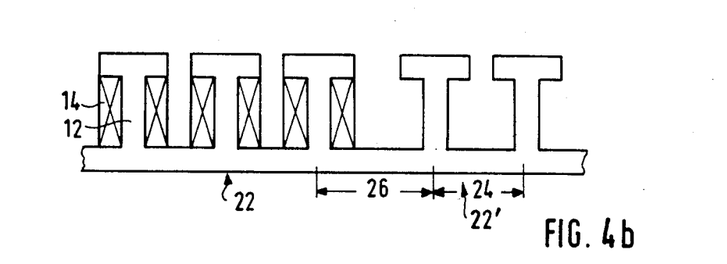
Figure 4C:
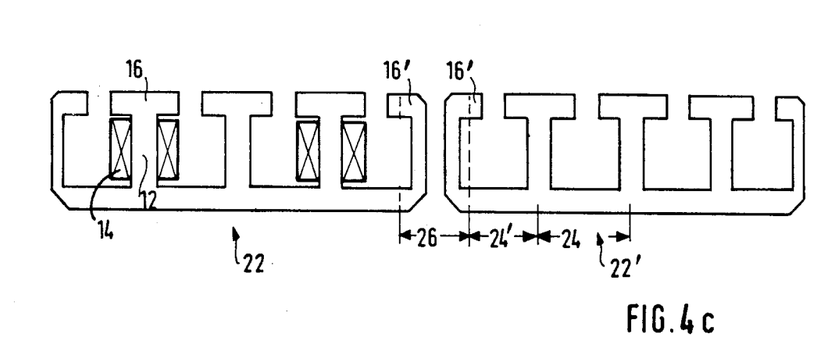

FIG. 4 shows several possibilities of designing the configuration of electromagnets 12 at the boundary or transition point between two groups 22 of electromagnets, below a row of permanent magnets 8 arranged with alternating polarity and the same permanent magnet pole distance, this row of permanent magnets applying to all three FIGS. 4a, 4b and 4c. In FIG. 4a, the right-hand group 22' of electromagnets is moved closer to the left-hand group 22 of electromagnets, resulting in an electromagnet pole distance 26 at the group boundary which is smaller than electromagnet pole distance 24 within groups 22'. The electromagnets themselves all have the same design. FIG. 4b shows an analogous design, although electromagnet pole distance 26 at the group boundary is larger. FIG. 4c shows a possible design in which each group 22 or 22' of electromagnets comprises five electromagnet pole faces 16. One can imagine the creation of this configuration most easily as follows: starting with a thoroughly identical arrangement of electromagnets, one electromagnet pole face 16 was cut up in its center at right angles to the direction in which the row of electromagnets 12 extends, and the resulting electromagnet pole halves 16' were moved apart at this cutting point, causing an electromagnet pole distance 26 at the group boundary which is smaller or larger than the "normal" electromagnet pole distance 24 to come about at this moving apart point. One can see the further peculiarity in this case that only the second and fourth electromagnet pole faces 16 of each group 22 or 22' of electromagnet poles—regarded progressing in the direction of the row of electromagnets—bear a winding 14, while the first, third and fifth electromagnet pole faces are unwound. At the base of each wound electromagnet pole face 16, the magnetic flux is divided toward the left and the right. Since the first and the last electromagnetpole faces are consequently each penetrated by only half the magnetic flux, they may be designed to have about half the cross-sectional size and about half the pole face of the others, which is why the term "pole half" 16' is justified. It may also be seen that the pole distance between each pole half 16' and the adjacent electromagnet pole face 16, i.e. pole distance 24', is somewhat smaller than the "normal" electromagnet pole distance 24. Such variants as these are also included in the scope of the invention.

Reference is further made explicitly to the fact that groups 22 or 22' of electromagnets may be designed not with five electromagnet pole faces 16 or 16', but also with three electromagnet pole faces, i.e. a central electromagnet pole face 16 and two pole halves 16', as shown in FIG. 4c for a larger number of electromagnet poles. In such groups consisting of three electromagnet pole faces, only the middle electromagnet pole face 16 bears a winding 14. This "triad configuration" is in fact particularly preferred in a development of the invention.

Figure 5A:
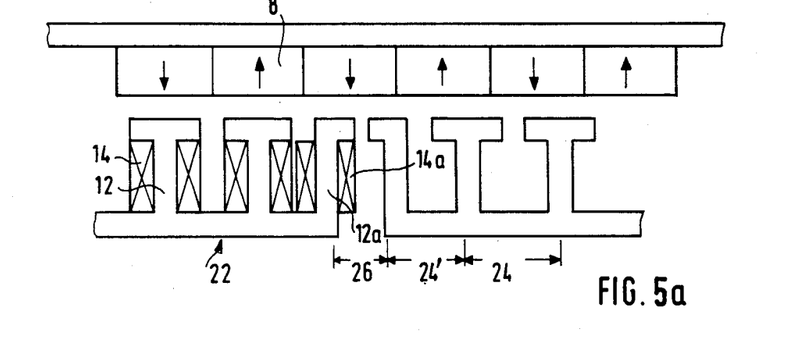
Figure 5B:
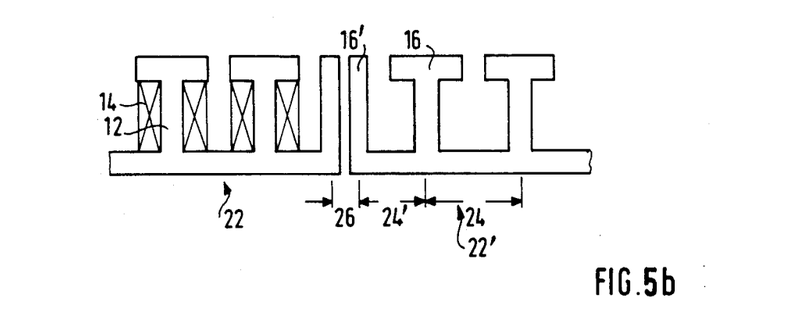

FIG. 5 shows several possibilities of designing the configuration of electromagnets 12 at the boundary or the transition point between two groups 22 and 22' of electromagnets, below a row of permanent magnets 8 arranged with alternating polarity and the same permanent magnet pole distance, this row of permanent magnets applying to both FIGS. 5a and 5b. FIG. 5a shows a possibility having a smaller electromagnet pole distance 26 at the group boundary, although the two electromagnets 12a at the edge are each moved slightly closer to the adjacent complete electromagnet of the same group 22, as has been described already with reference to FIG. 4c. Electromagnets 12a at the edge each bear a winding 14a having a smaller cross-section and have a smaller pole face, in order to do justice to the change in the available space. FIG. 5b shows a possibility in which electromagnet pole distance 26 at the group boundary is again smaller than the normal electromagnet pole distance 24. Here, too, one can see unwound pole halves 16' at the group boundary, although without pole heads enlarged at the top as were present in the embodiment according to FIG. 4c, and a somewhat smaller electromagnet pole distance 24' between electromagnet pole face 16' at the edge and the adjacent electromagnet pole face 16 of the group 22 involved.

In the embodiment according to FIG. 4b, the bases of electromagnets 12 run into each other at the group boundary. However, a magnetic disconnection could also be provided here, as shown in all other embodiments of FIGS. 4 and 5. In all embodiments of FIGS. 4 and 5, windings 14 are only shown for electromagnets 12 of the left-hand electromagnet group 22 in each case; in the right-hand group 22' they have been omitted for the sake of simplicity. The unwound legs provided in FIGS. 4c and 5b improve the utilization of the magnetic flux in the area of the group boundary as well, whereby the design of the pole head is determined by the available space and optimum adaptation to the magnetic flux to be conducted.

The design of the electronic switching means 30 described did not have to be described in more detail since an expert is familiar with such switching means or can construct such switching means on the basis of his expert knowledge without difficulty. Four-quadrant controlling means are preferred as switching means, and a specific example of an appropriate four-quadrant controlling means can be found in European laid-open print No. 94 978.

It is explicitly pointed out that permanent magnets with a relative permeability in the order of magnitude of the permeability of air ($\mu = 1$) are used in a preferred embodiment of the invention. When an electromotor is operated, the electromagnetic fields usually lead to weakened reactions in the exciter part of the electromotor, the intensity of these reactions depending on the magnetic resistance in the individual magnetic circuits between the stator and the rotor. In the embodiment of the invention described, however, the various magnetic circuits have high magnetic resistance even if the air gap is thin, due to the relative permeability of the permanent magnets which is lower than that of iron by several orders of magnitude. Consequently, the weakened reactions described are crucially reduced. Furthermore, the inductance of the electromagnets to be switched is decreased substantially so that one can work at a high switching speed of the electromagnet poles. Permanent magnets made of a material on a rare earth base with cobalt, in particular samarium cobalt permanent magnets, are particularly preferred.

We claim:

1. A rotary electromotor having a stator with stator poles and a rotor with rotor poles, electromagnets operatively connected to the stator poles and permanent magnets operatively connected to the rotor poles, and electronic switching means operatively connected to the electromagnets for switching the electromagnets in dependency of the relative position of the stator and the rotor, the improvement comprising:
    said stator poles being arranged in groups, with the pole distances between the stator poles belonging to a common group being substantially equal and substantially corresponding to the pole distance between the rotor poles;
    said stator pole groups comprising end stator poles having no winding;
    said switching means operatively connected to the groups of electromagnets for switching simultaneously the electromagnets within each group, and adjacent groups thereof at differing times.

2. An electromotor according to claim 1 wherein the stator pole groups have alternate stator poles having no windings.

3. An electromotor according to claim 2 wherein the stator pole groups each consist of three stator poles.

4. An electromotor according to claim 2 wherein the stator pole groups each consist of five stator poles.

5. An electromotor according to claim 1 wherein a plurality of electronic switching means is provided, each associated to one of the stator pole groups and controlled by a common means for detecting the relative position of the rotor poles to the stator pole group.

6. An electromotor according to claim 1 wherein the electronic switching means includes a plurality of electronic subswitching means per stator pole group, said plurality of electronic subswitching means being controlled by a common sensor means for detecting the relative position of the rotor poles to the stator pole group.

7. A rotary electromotor having a stator with stator poles and a rotor with rotor poles, electromagnets operatively connected to the stator poles and permanent magnets operatively connected to the rotor poles, and electronic switching means oepratively connected to the electromagnets for switching the electromagnets in dependency of the relative positions of the stator and the rotor, the improvement comprising:
    said stator poles being arranged in groups, each group having a plurality of stator poles forming an electromagnetic circuit, with the pole distances between the stator poles belonging to a common group being substantially equal and substantially corresponding to the pole distances between the rotor poles;
    said groups .of electromagnets being spaced with respect to each other for forming transition points between the groups, the pole distance between the transition point forming electromagnets differing from the pole distance between the rotor poles;
    said electronic switching means operatively connected to the groups of electromagnets for switching simultaneously the electromagnets within each group, and adjacent groups thereof at differing times;
    said plurality of stator poles forming an electromagnetic circuit disconnected between groups at their transition points for disconnecting the electromagnetic circuit at the transition points thereby reducing substantially the disturbing reactions occurring between adjacent electromagnet groups being switched at different times; and
    said stator pole groups having end stator poles with no windings.

8. An electromotor according to claim 7 wherein alternate stator poles within the stator pole groups have no windings.

9. An electromotor according to claim 8 wherein the stator pole groups each consist of three stator poles.

10. An electromotor according to claim 8 wherein the stator pole groups each consist of five stator poles.

11. A rotary electromotor having a stator with stator poles and a rotor with rotor poles, electromagnets operatively connected to the stator poles and permanent magnets operatively connected to the rotor poles, and electronic switching means operatively connected to the electromagnets for switching the electromagnets in dependency of the relative positions of the stator and the rotor, the improvement comprising:
    said stator poles being arranged in groups, each group having a plurality of stator poles forming an electromagnetic circuit with the pole distances between the stator poles belonging to a common group being substantially equal and substantially corresponding to the pole distance between the rotor poles;
    said groups of electromagnets being spaced with respect to each other for forming transition points between the groups, the pole distance between the transition point forming electromagnets differing from the pole distance between the rotor poles;
    said electronic switching means operatively connected to the groups of electromagnets for switching simultaneously the electromagnets within each group, and adjacent groups thereof at differing times;

said plurality of stator poles forming an electromagnetic circuit disconnected between groups at their transition points for disconnecting the electromagnetic circuit at the transition points thereby reducing substantially the disturbing reactions occurring between adjacent electromagnet groups being switched at different times; and said stator pole groups having end stator poles with less winding than the adjacent stator poles of the respective group.

12. A rotary electromotor having a stator with stator poles and a rotor with rotor poles, electromagnets operatively connected to the stator poles and permanent magnets operatively connected to the rotor poles, and electronic switching means operatively connected to the electromagnets for switching the electromagnets in dependency of the relative positions of the stator and the rotor, the improvement comprising:

said stator poles being arranged in groups, each group having a plurality of stator poles forming an electromagnetic circuit with the pole distances between the stator poles belonging to a common group being substantially equal and substantially corresponding to the pole distances between the rotor poles;

said groups of electromagnets being spaced with respect to each other for forming transition points between the groups, the pole distance between the transition point forming electromagnets differing from the pole distance between the rotor poles;

said electronic switching means operatively connected to the groups of electromagnets for switching simultaneously the electromagnets within each group, and adjacent groups thereof at differing times;

said plurality of stator poles forming an electromagnetic circuit disconnected between groups at their transition points for disconneting the electromagnetic circuit at the transition points thereby reducing substantially the disturbing reactions occurring between adjacent electromagnet groups being switched at different times; and wherein the electronic switching means includes a plurality of electronic subswitching means per stator pole group, said plurality of electronic subswitching means being controlled by a common sensor means for detecting the relative position of the rotor poles to the stator pole group.

13. A rotary electromotor comprising:

a stator with stator poles and a rotor with rotor poles, electgromagnets and permanent magnets selectively connected to the stator and rotor poles;

switching means operatively connected to the electromagnets for switching the electromagnets in dependency of the relative positions of the stator and the rotor;

said stator poles being arranged in groups, each group having a plurality of stator poles forming an electrogmagnetic circuit, with the pole distances between the stator poles belonging to a common group being substantially equal and substantially corresponding to the pole distances between the rotor poles;

said groups of electromagnets being spaced with respect to each other for forming transition points between the groups, the pole distance between the transition point forming electromagnets differing from the pole distance between the rotor poles;

said switching means operatively connected to the groups of electromagnets for switching simultaneously the electromagnets within each group and adjacent groups thereof at differing times;

said plurality of poles forming the electromagnetic circuits being disconnected between groups at their transition points for disconnecting the electromagnetic circuit at the transition points; and said group of poles forming the electromagnetic circuits having windings with end poles having less winding than the adjacent poles of the respective group.

* * * * *

UNITED STATES PATENT AND TRADEMARK OFFICE
CERTIFICATE OF CORRECTION

PATENT NO. : 4,754,207

DATED : June 28, 1988

INVENTOR(S) : Gotz Heidelberg and Andreas Grundl

It is certified that error appears in the above-identified patent and that said Letters Patent is hereby corrected as shown below:

Front page and Column 1 in the title, "Electromagnets With Adjacent Groups of Electromagnets Having Different Switching Phases" should be --Electromotor With Adjacent Groups of Electromagnets Having Different Switching Phases--.

Column 3, line 42, "eletronic" should be --electronic--.

Column 4, line 5, "laidopen" should be --laid open--.

Column 5, lines 25 and 31, "sub-switching" should be --subswitching--.

Column 6, line 39, "permanant" should be --permanent--.

Column 8, line 11, "electromagnetpole" should be --electromagnet pole--.

Column 10, line 8, "oepratively" should be --operatively--.

Column 12, claim 13, line 3, "electgromagnets" should be --electromagnets--.

UNITED STATES PATENT AND TRADEMARK OFFICE
CERTIFICATE OF CORRECTION

PATENT NO. : 4,754,207

DATED : June 28, 1988

INVENTOR(S) : Gotz Heidelberg and Andreas Grundl

It is certified that error appears in the above-identified patent and that said Letters Patent is hereby corrected as shown below:

Column 12, claim 13, line 11, "electgromagnets" should be --electromagnets--.

Signed and Sealed this

Thirteenth Day of December, 1988

Attest:

DONALD J. QUIGG

Attesting Officer     Commissioner of Patents and Trademarks